United States Patent [19]

Jandeska et al.

[11] 4,104,787

[45] Aug. 8, 1978

[54] FORMING CURVED WAFER THIN MAGNETS FROM RARE EARTH-COBALT ALLOY POWDERS

[75] Inventors: William F. Jandeska, Rochester; Charles F. Netherton, Marine City; Charles W. Vigor, Rochester, all of Mich.

[73] Assignee: General Motors Corporation, Detroit, Mich.

[21] Appl. No.: 779,525

[22] Filed: Mar. 21, 1977

[51] Int. Cl.² ........................................... H02K 15/02
[52] U.S. Cl. ..................................... 29/596; 29/420.5; 29/608; 75/200; 75/208 R; 75/226; 148/103; 228/186; 228/265; 310/42; 310/154; 310/254
[58] Field of Search ...................... 29/596, 608, 420.5; 310/42, 154, 254; 75/200, 208 R, 226; 148/103; 264/58, 60, 61; 228/173 A, 265, 186

[56] References Cited

U.S. PATENT DOCUMENTS

| 3,615,915 | 10/1971 | Luiten et al. | 148/103 |
|---|---|---|---|
| 3,663,317 | 5/1972 | Westendorp | 148/103 |
| 3,761,257 | 9/1973 | Dunn | 75/208 R |

OTHER PUBLICATIONS

"Application of Hot Pressing in Fabricating Radial Polarized SmCo Magnets," IEEE Mag., vol. 11, p. 1455: 1975.

*Primary Examiner*—Carl E. Hall
*Attorney, Agent, or Firm*—George A. Grove

[57] ABSTRACT

In a preferred embodiment thin curved rare earth-cobalt magnets supported on the interior surface of a steel casing are formed by hot isostatic compaction. Rare earth-cobalt powder is magnetically aligned and compacted to at least 65% of the theoretical density. The relatively strong, curved green compacts are positioned on a curved mandrel and placed in a closely fitting steel casing which is evacuated and sealed. The magnets are densified under isostatic gas pressure at elevated temperatures and bonded to the steel. The steel backing serves as an integral motor casing when such magnets are used in D.C. motors.

3 Claims, 8 Drawing Figures

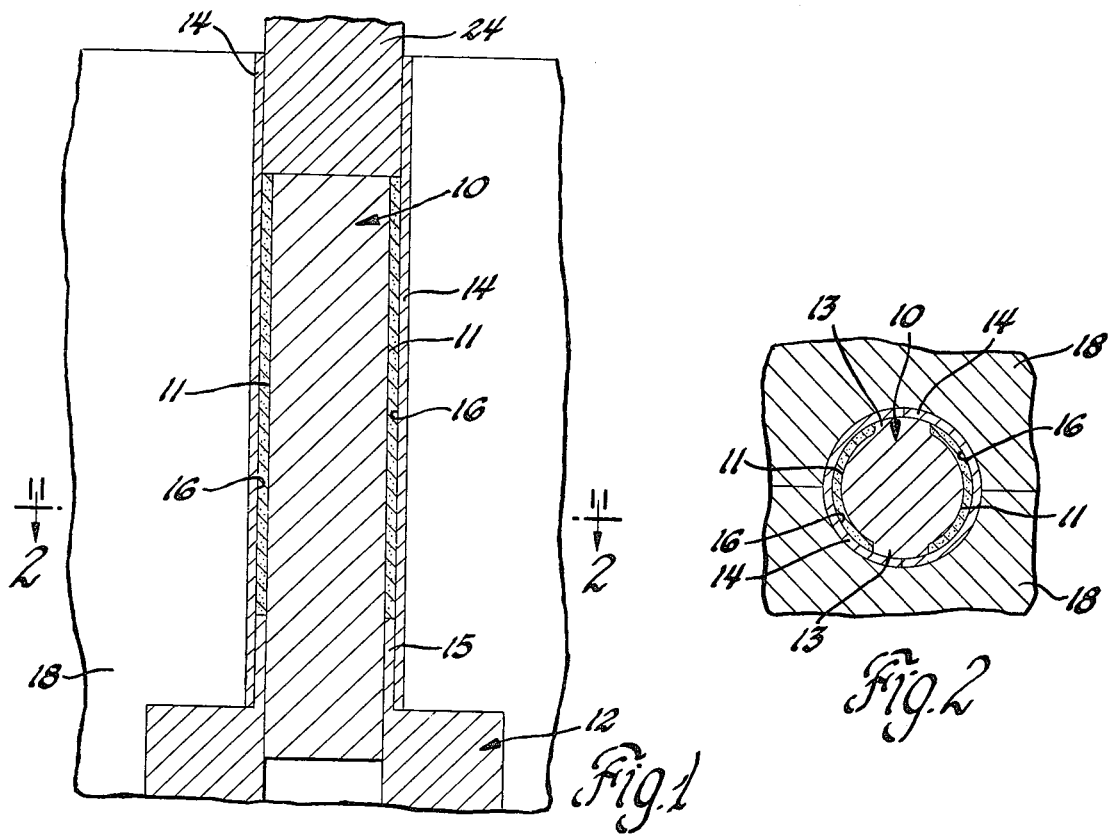
Fig.1
Fig.2
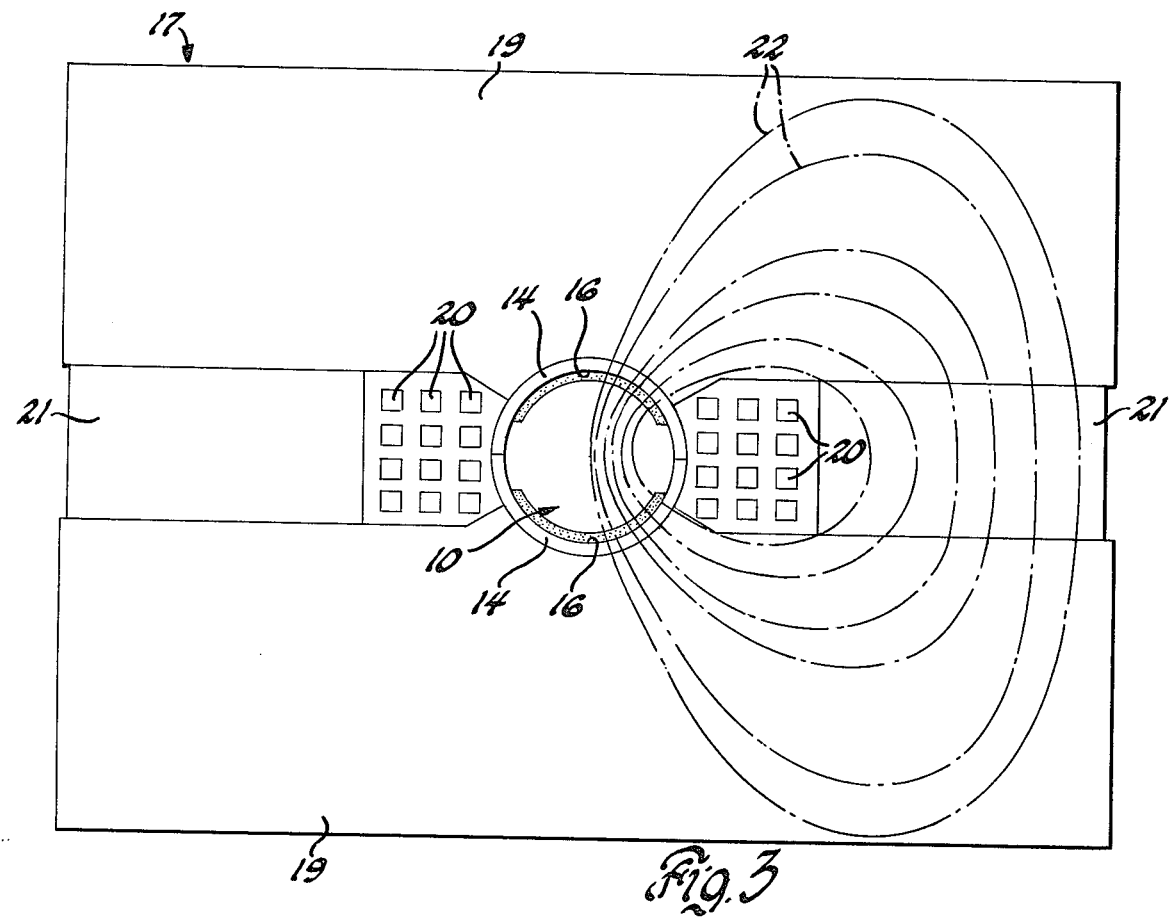
Fig.3

FORMING CURVED WAFER THIN MAGNETS FROM RARE EARTH-COBALT ALLOY POWDERS

This invention relates to the manufacture of rare earth metal-cobalt (RE-Co) permanent magnets, and more particularly to a method of making RE-Co metal powders into curved, thin permanent magnets which may be used, e.g., as pole magnets for D.C. motors. RE-Co magnets only a millimeter thick but with large curved surface areas are made in a practical process in which strong green compacts are formed and bonded to steel backing members.

Rare earth-transition metal (RE-TM) permanent magnets are well known for their superior magnetic energy products which are markedly higher than those of conventional permanent magnets. Therefore, they are particularly useful in small sized but relatively high torque D.C. motors. For example, present power window lift motors with wire-wound iron magnets will not fit into lighter, thinner car doors. However, suitable motors could be made with thin curved RE-TM, particularly RE-Co, magnets. Before this invention it was not known how to form such thin curved RE-Co magnets except by grinding flat magnets into suitable shapes. Grinding is wasteful of the RE-Co powders and prohibitively expensive by industrial production standards.

RE-TM compositions are a family of material containing one or more of the rare earth metals and one or more of the magnetic transition metals such as iron, nickel or cobalt. Compounds of $RECo_5$ and $RECo_{17}$ in particular are known to have superior magnetic properties. Up to the present time magnets have been made from such compositions by grinding them into powder and forming the powder into magnets by powder metallurgy techniques. However, such methods have not been successfully employed to produce thin, contoured permanent magnets on a practical basis.

It is an object of this invention to provide a method of making thin, curved RE-Co magnets.

It is a more specific object of this invention to provide a method of making thin arcuate shaped rare earth-cobalt magnets particularly useful in D.C. motors. The method involves both a procedure for making a green compact of a magnet from powder and for densifying the compact on a magnetically permeable backing layer. Tubular steel backings are particularly suited for use as casings and function as the return path for flux in D.C. motors.

Another object of the invention is to make strong green compacts from RE-Co powders which can be handled without breaking.

In accordance with a preferred embodiment of our invention, these and other objects and advantages are obtained by filling a thin curved die cavity with RE-Co powder and magnetically aligning the powder in a direction radial to its curvature. The powder is compacted in a direction axial to the die curvature to a density of at least 65% of theoretical forming a relatively strong, magnetic green compact. A typical compact intended for use as a pole-piece in a small D.C. motor might be 60 mm long, 1 mm thick, have a curvature radius of 25 mm and an arc radius of 114°.

A green compact formed as above is then positioned on a suitably shaped mandrel and the assembly is placed in a thin wall steel enclosure or casing that fits closely over the compact. The casing is evacuated, sealed and loaded into an autoclave at a temperature of about 1000° C. and pressure of about 40 MPa. Under these conditions the steel enclosure becomes plastic and is pressed uniformly against the compact. The compact is densified to greater than 90% of the theoretical density of 100% and the steel enclosure is bonded to the compact. The forming mandrel is removed from the can leaving a thin, dense, arcuate shaped RE-Co magnet metallurgically bonded to its inside wall. Thus, at least a portion of the steel that served as the isostatic compaction enclosure now serves as a backing for the finished RE-Co magnet. Any excess steel can be trimmed from around the backed magnet and, if desired, the magnet itself can be cut into pieces without breaking.

In accordance with the method briefly summarized above, thin curved magnets can be formed from rare earth-cobalt powders. Dense green compacts can be made and handled without breaking. Steel backed densified curved magnets can be made and cut into desired sizes or RE-Co pole magnets can be sintered directly onto the casing of small electric motors.

These and other objects and advantager of our invention will be better understood in view of a detailed description which follows. Reference will be made to the drawings in which:

FIG. 1 depicts an elevation in cross-section of an apparatus for axially compressing RE-Co powders into arcuate wafer thin shapes including the workpiece and compacting tool assembly of mandrel, mandrel restraint, die liners, punch and powder;

FIG. 2 is a sectional view of the apparatus of FIG. 1 along line 2—2;

FIG. 3 is a plan view showing the workpiece assembly positioned in a magnetizing apparatus with flux lines generated by the coils;

Long, thin RE-Co magnets having circular curvatures are particularly good pole magnets for small cylindrically shaped D.C. motors. In a preferred embodiment of the invention not only can such pole magnets be easily made but they can advantageously be compacted against and metallurgically bonded to the casings of such motors by hot isostatic compaction. Moreover, the casing can be constructed so that the armature and bushings can be inserted at the ends. The motor casing itself functions as the return flux path for the motor during operation.

Figure 7:
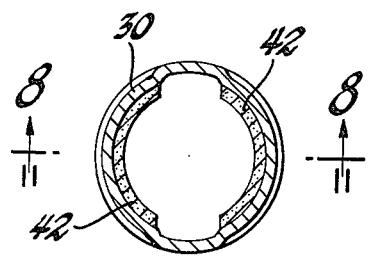
FIG. 7 is an axial sectional view of the motor casing.
Figure 8:
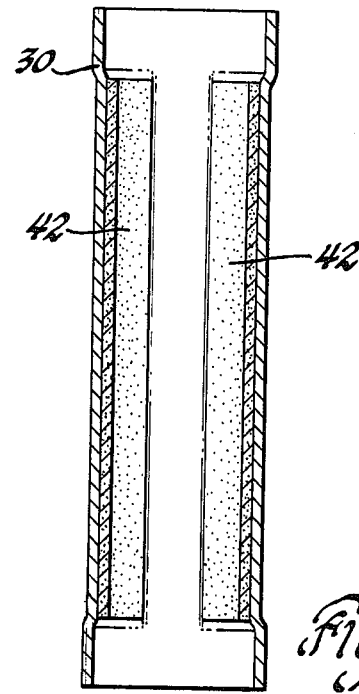
FIG. 8 is a cross sectional view of a finished steel motor casing containing two arcuate shaped wafer thin RE-Co magnets along line 8—8 of FIG. 7.

For example, a small, thin window lift motor was constructed with $SmCo_5$ magnets 42 formed against and metallurgically bonded to a tubular motor casing 30 as shown in FIGS. 7 and 8. It is seen that the magnets are spaced apart and diametrically opposed.

Referring to FIGS. 1 and 2, a ferromagnetic mandrel 10 is employed having opposing surface segments 11 defining circular arcs sized to form the inside curved surface of the magnet compacts to be formed. Since it is preferred to have symmetric die loads on the mandrel during compaction at least two magnet compacts are formed at a time. The mandrel is provided with opposing ribs 13 to separate the compacts. The mandrel is slidably retained in a tightly fitting annular restraint ring 12. Ring 12 has an upper annular shoulder 15. Semicircular nitrided steel die liners 14 enclose the mandrel as seen in FIG. 2 and define cavities between themselves and surfaces 11 forming two long, thin, curved cavities 16 (shown filled with RE-Co powder). The bottom of the cavity 16 is defined by shoulder 15. The upper boundary of the cavity 16 is defined by punch 24 which is slidable in liners 14 and bears down on mandrel 10 and powder cavity 16. This assembly is placed in a split die block 18 of a hydraulic press.

SmCo$_5$ powder was poured into the cavities. The die was vibrated by means not shown to assist downward powder flow. The powder was then lightly compacted by downward movement of punch 24 to a density of about 40% of the theoretical. The assembly of the restraint ring 12, die liners 14 and compacted powder in cavity 16 was removed from the die block 18.

The assembly was then placed in a magnetizing fixture 17 shown in FIG. 3 to align the SmCo$_5$ powder. The fixture included soft iron blocks 19, magnetizing coils 20 and soft iron spacers 21 to hold the coils and compaction assembly in place. A current was pulsed through the magnetizing coils 20 to create a strong magnetic field across the assembly as illustrated by the field lines 22. The mandrel 10 is chosen to be permeable to a magnetic field so that it does not interfere with the aligning magnetic field. The powder in the cavities was magnetically aligned by the pulse to a radial north-south polarity with respect to the magnet curvature.

The assembly was removed then from the magnetizing fixture 17 and replaced in the split die block 18 of the press. The punch 24 was forced downward pushing mandrel 10 through lower restraint ring 12, the punch 24 and the stationary shoulder 15 exerting an axial compacting force on the powder in the cavities 16. The punch was extracted and the die blocks 18 were separated to release the compact assembly. The die liners 14 were removed and the two relatively strong magnetic green compacts with a density of about 70% of the theoretical were slid off the mandrel 10.

Figure 4:
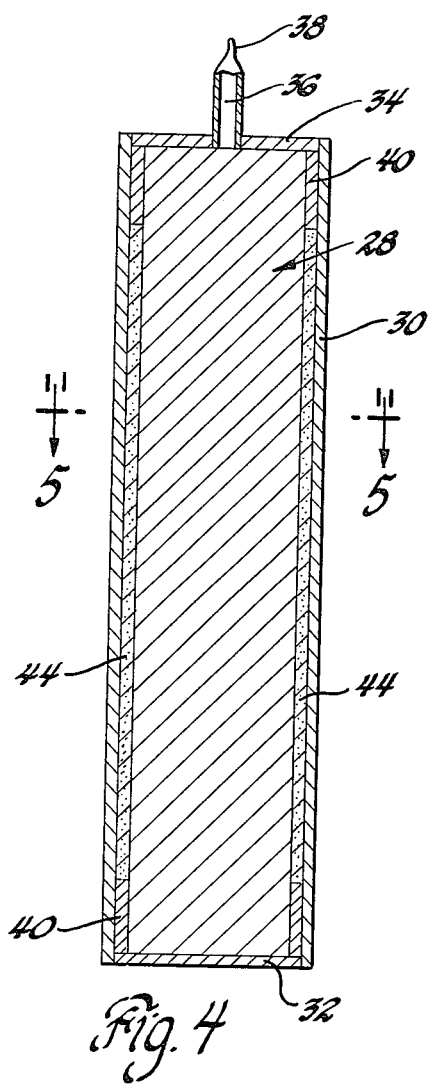
FIG. 4 depicts a section of an assembly of green compacts, forming mandrel and die spacers in an evacuated steel casing prior to isostatic compaction.
Figure 5:
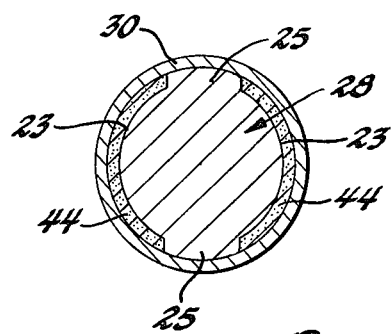
FIG. 5 is a sectional view of the assembly of FIG. 4 along line 5—5.

Referring to FIGS. 4 and 5, the green compacts 44 were positioned against a stainless steel mandrel 28 in opposing surface segments defining circular arc segments 23 sized to define the interior curved surfaces of the finished magnets, said segments being separated by opposing ribs 25. Since it was desired to fabricate a full length motor casing, the mandrel was sized to be longer than the RE-Co compacts and stainless steel spacers 40 were inserted in the surface segments of the mandrel above and below the green compacts. The compacts, mandrel and spacers were placed in a closely fitting tubular steel casing 30. The casing was sealed at one end with a solid plug 32 and a vented plug at the other end 34. The casing was then evacuated through the vent 36 and sealed 38. The assembly was then placed in an autoclave for hot isostatic compaction (HIP).

Figure 6:
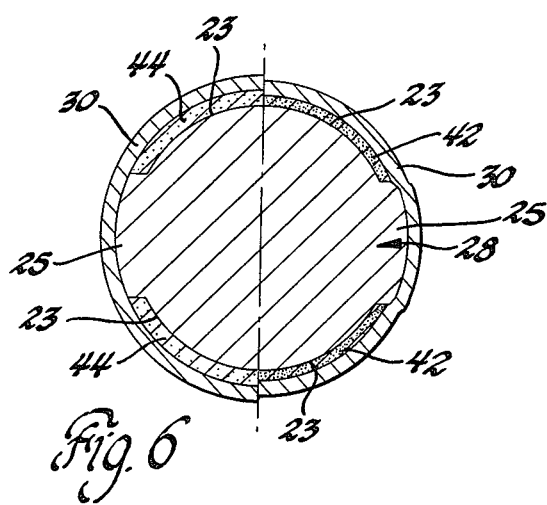
FIG. 6 is a split sectional view of the assembly of FIG. 4 along line 5—5 comparing the RE-Co compacts in the steel casing before and after hot isostatic compaction.

The green compacts were densified as hot, pressurized argon gas in the autoclave pushed the casing against the compacts, spacers and mandrel. FIG. 6 shows the green RE-Co compacts 44 in the casing 30 before HIP and the densified magnets 42 after HIP. It is noted that the casing is extremely pliable at HIP temperatures and pressures so the casing deforms to match the circular contour of mandrel and spacers and collapses inwardly towards the densified compacts. Under such conditions the RE-Co magnets also form metallurgical bonds with the casing metal.

After the compacts were densified to greater than 90% of the theoretical density and metallurgically bonded to the casing, the assembly was cooled. The caps, stainless steel mandrel and spacers were removed leaving the SmCo$_5$ pole magnets 42 appropriately positioned on the tubular steel motor casing 30 as shown in FIGS. 7 and 8. The casing can be cut to length and the motor armature easily inserted between the pole magnets.

Our invention is further described by the following specific example.

Equal parts by weight of a commercial SmCo$_5$ powder (34.6% by weight samarium) and a commercial samarium-cobalt sintering aid composition containing 36.5% by weight samarium were milled together. The resulting mixture had a nominal powder particle size of 7 microns. The powdered mixture was poured into molding cavities as described above in connection with FIGS. 1 and 2. The cavities were defined in this instance by opposing 114° arcs having an inside radius of 27 mm and an outside radius of 28 mm and a cavity length of about 58 mm. The die was vibrated by mechanical means to assist in packing the powder in the mold before compressions. The powder was loosely compacted in the press to a density of about 40% of the theoretical.

The assembly of the mandrel, die liners and lower restraint ring was removed from the split die block to a magnetizing apparatus as illustrated in FIG. 3. A single pulse of current in the magnetizing coils generated a field of 25,000 Gauss which aligned the SmCo$_5$ powder to a high degree in a north-south radial pole direction across the full 114° of magnet arc.

The assembly was replaced in the die press and the powder was axially compacted with a die force of about 1300 MPa to a pack density of about 70%. The split die block was then separated to release the assembly. The die liners were removed and the magnetized green SmCo$_5$ compacts were slid off the mandrel. Although the compacts were fragile, they were easily removed from the mandrel to which they were strongly magnetically attracted without breaking.

The green compacts were positioned on a forming mandrel of AISI 303 stainless steel coated with boron nitride to prevent the compacts from bonding to it during HIP. The compacts and mandrel were inserted into a closely fitting tubular casing of 9 gage AISI 1008 steel. Stainless steel spacers were inserted above and below the green compacts in the casing to maintain its cylindrical shape during HIP and the casing was plugged as shown in FIG. 4. The casing was heated to 475° C. under vacuum and the vent was sealed when a pressure of $10^{-3}$ mm$_{Hg}$ was achieved.

The green compacts were densified to 97% of theoretical and bonded to the casing under isostatic gas pressure in an autoclave. The casing was heated in the argon atmosphere of the autoclave to a temperature of 1000° C. and maintained at this temperature at a pressure of 40 MPa for 30 minutes.

The casing was cooled and the stainless steel mandrel and inserts were removed leaving a tubular structure with densified SmCo$_5$ magnets bonded thereto particularly suited for use as a D.C. motor casing.

In the above example, steel was used for the motor casing. However, it will be appreciated that in other embodiments where a ferromagnetic backing layer is desired for RE-Co magnets, other metals such as alloys of iron, nickel and cobalt are also suitable. It is preferred to use steel because it is relatively inexpensive and readily available.

Our method has been illustrated in terms of using samarium-cobalt powder to make the permanent magnets. This is a preferred embodiment but other rare earth-cobalt compositions including any of the following are similarly useful: yttrium, lanthanum, cerium, praseodymium, neodymium, promethium, europium, gadolinium, terbium, dysprosium, holmium, erbium, thulium, ytterbium, and lutetium. The rare earth constituent may also be in the form of misch metals, naturally occurring compositions. An exemplary misch metal is cerium misch metal which typically comprises by weight about 53% cerium, 24% lanthanum, 5% praseodymium, 16% neodymium, and 2% other rare earths. Moreover, as is known in the art, small percentages of elements such as copper or aluminum may be added to the RE-TM compositions to improve the coercivity of the magnets.

The green compacts were presssed in a split die block according to the example. However, a one piece die block may be used and the green compacts ejected from it by causing the upper punch to push the compacts, mandrel and lower restraint through the block.

The die press arrangement shown in FIG. 1 is particularly suited for axially compacting the RE-Co powders between the thin curved ends of the die cavities. In this arrangement, the floating mandrel serves to distribute the compacting force over the whole working surface area of the punch reducing the tendency of the punch to gall or warp in production. Therefore, high compaction forces can be applied to form strong green compacts without damaging the tools. Green compacts must have a pack density of at least 65% to be handled without breaking.

Densification of RE-Co powder compacts in the HIP occurs essentially by the radial inward displacement of the flexible casing around the green magnet compacts. The casing is pressed against the magnet compacts and the mandrel without buckling or creasing providing that the original pack density of the rare earth-cobalt powder in the green compacts approaches about 60% of theoretical. Also, a casing in which the green compacts and forming mandrel are placed must be such that it can be sealed and evacuated and maintain a good vacuum at pressures and temperatures reached during HIP. Moreover, it is important that the casing metal be flexible enough to deform around the magnets during hot isostatic compaction.

Although green compacts can be compressed in the same direction as the magnetic alignment of the powder, it is preferably to compact the powders in a direction perpendicular to their magnetic alignment. Commercial magnet producers have reported a 10 to 15% improvement in magnetic flux when cold pressing is done perpendicular to the magnetic alignment direction of $SmCo_5$ powder. (Hitachi Magnets Corporation, Permanent Magnet Motor Seminar, January 20–21, 1976, Grand Rapids, Mich.)

In the example only two magnets were compacted in one casing, however, numerous compacts can be positioned on a single, longer forming mandrel and placed in a suitably sized can. The maximum length of the casing is limited primarily by the size of the HIP apparatus and the ability to achieve a good vacuum in the casing.

The casing is evacuated to prevent the expansion of residual gases during HIP. Such gases would effectively decrease the externally applied fluid pressure during HIP and hinder magnet densification. Moreover, RE-Co powders are highly reactive at elevated HIP temperatures and the magnets would be contaminated if residual gases were present.

Hot isostatic compaction of RE metal-cobalt magnet compositions can be accomplished in any gas environment having an atmosphere nondestructive to the sealed casing at temperatures in the range of about 900° to 1200° C. and at pressures of from about 20 to 200 MPa. A typical time for HIP is about 30 minutes, however, any time sufficient to densify magnets to a density greater than 90% and bond them to the backings is appropriate. Examination of magnets compacted by HIP showed good intermetallic bonds between rare earth-cobalt magnets and steel backings with little intermingling of the metals.

The mandrel used in the HIP process is preferably coated with a material that keeps it from bonding to the RE-Co compacts at high temperatures and pressures. Boron nitride is a suitable coating. Moreover, it is preferred that the forming mandrel have a coefficient of thermal expansion higher than that of the casing material and the RE-Co magnets so that when the assembly cools, the mandrel shrinks away from the metal backed magnets and can be easily removed from the casing and magnets.

Magnets made by the methods taught herein are particularly suitable for use in small D.C. motors such as those used in automobile window lift motors. Among the advantages of using this method are the easy handling extremely brittle compacts of rare earth-cobalt materials, elimination of the necessity for diamond grinding flat magnets to achieve arcuate surfaces, and minimization of waste of expensive rare earth-cobalt powders. Moreover, the magnets are integrally bonded to a casing during the HIP process and the casing may serve directly as a motor casing providing a return pass for magnetic fluxes during motor operation.

While our invention has been disclosed in terms of specific embodiments, it will be appreciated that other forms could readily be adapted by one skilled in the art. Accordingly, the scope of our invention is to be considered limited only by the following claims.

What is claimed is:

1. A method of making a D.C. motor having thin, curved rare-earth cobalt permanent field magnets carried on the motor casing, comprising:

placing a mandrel having a working surface shaped to define the inner surface of a green powder compact of a curved magnet in a spaced apart positon adjacent to a die to form a molding cavity for said compact between the mandrel and the die, filling the cavity with rare-earth cobalt metal powder, magnetically aligning the powder to a radial direction with respect to the curvature of the desired permanent magnet, compacting the aligned powder in the axial direction with respect to the curvature of the magnet to form a green compact having a pack density of at least 65% of the theoretical density of said powder, positioning at least two such green compacts on a mandrel shaped to locate the magnets in their intended position in the motor casing and to form the interior curved surfaces of the magnets, enclosing the assembly of the compacts and mandrel in a casing comprising a thin wall metal sheet capable of serving as the motor casing and of retaining a vacuum and excluding high temperature, high pressure gases, evacuating the casing, sealing the casing, densifying the evacuated compacts under an isostatic gas pressure of from about 20 to 200 MPa at a temperature of from about 900° to 1200° C. for a time sufficient to densify the magnets and metallurgically bond them to the casing, and removing the mandrel.

2. A method of forming a thin, curved rare-earth magnet bonded on its outside curved surface to a metallic backing member comprising:

positioning a green compact of RE-Co powder formed in the curved configuraiton of the desired magnet on a mandrel shaped to form the interior curved surface of the magnet, enclosing the assembly of the compact and mandrel in a casing comprising a thin wall metal sheet capable of retaining a vacuum and excluding high temperature, high pressure gases, evacuating the casing, sealing the casing, densifying the evacuated compact against the mandrel by subjecting the casing to an isostatic gas pressure of from about 20 to 200 MPa at a temperature of from about 900° to 1200° C. for a time sufficient to densify the magnet, and metallurgically bond it to the casing, removing the mandrel.

3. A method of making a thin, curved permanent magnet from a powder consisting essentially of a rare earth metal and a transition metal taken from the group consisting of iron, nickel and cobalt wherein said magnet is bonded on its outside surface to a steel backing member comprising:

placing a mandrel having a working surface shaped to define the inner surface of a green powder compact of a curved magnet in a spaced apart position adjacent to a die to form a molding cavity between the mandrel and the die, filling the cavity with a said powder, magnetically aligning the powder, compacting the aligned powder in the axial direction with respect to the curvature of magnet to form a green compact having a pack density of at least 65% of the theoretical density, positioning the green compact on a mandrel shaped to form the interior curved surface of the magnet, enclosing the compact and mandrel in a casing comprising a thin wall metal sheet capable of retaining a vacuum and exluding high temperature, high pressure gases, evacuating and sealing the casing, densifying the compact against the mandrel by subjecting the casing and its contents to an isostatic gas pressure of from about 20 to 200 MPa at a temperature of from about 900° to 1200° C. for a time sufficient to densify the magnet and metallurgically bond it to the casing, and removing the mandrel.

\* \* \* \* \*